United States Patent
Johnson et al.

(10) Patent No.: US 10,756,968 B2
(45) Date of Patent: Aug. 25, 2020

(54) NETWORK RESOURCE MANAGEMENT DEVICES METHODS AND SYSTEMS

(71) Applicant: RAPID7, INC., Boston, MA (US)

(72) Inventors: Brian Johnson, Alexandria, VA (US); Andrew Mann, Cedar Park, TX (US); Chris Deramus, Oak Hill, VA (US)

(73) Assignee: RAPID7, INC., Boston, MA (US)

( * ) Notice: Subject to any disclaimer, the term of this patent is extended or adjusted under 35 U.S.C. 154(b) by 538 days.

(21) Appl. No.: 15/005,789

(22) Filed: Jan. 25, 2016

(65) Prior Publication Data

US 2016/0218926 A1 Jul. 28, 2016

Related U.S. Application Data (60) Provisional application No. 62/107,634, filed on Jan. 26, 2015.

(51) Int. Cl.
*G06F 15/16* (2006.01)
*H04L 12/24* (2006.01)
*H04L 12/26* (2006.01)
*H04L 29/06* (2006.01)

(52) U.S. Cl.
CPC ...... *H04L 41/0816* (2013.01); *H04L 41/0893* (2013.01); *H04L 41/12* (2013.01); *H04L 41/5025* (2013.01); *H04L 43/0817* (2013.01); *H04L 41/5096* (2013.01); *H04L 63/101* (2013.01)

(58) Field of Classification Search
None
See application file for complete search history.

(56) References Cited

U.S. PATENT DOCUMENTS

| | | | |
|---|---|---|---|
| 8,122,282 B2 | 2/2012 | Betzler et al. | |
| 8,719,804 B2 | 5/2014 | Jain | |
| 8,789,157 B2 | 7/2014 | Sinn | |
| 8,813,225 B1 | 8/2014 | Fuller | |
| 8,832,459 B2 | 9/2014 | Dehaan | |
| 9,009,697 B2 | 4/2015 | Breiter | |
| 9,081,610 B2 | 7/2015 | Emaru | |
| 9,086,923 B2 | 7/2015 | Parashar | |
| 9,203,784 B2 | 12/2015 | Chang | |
| 9,246,986 B1* | 1/2016 | Ward, Jr. | H04L 67/10 |
| 2002/0104014 A1* | 8/2002 | Zobel | H04L 63/1425 726/26 |

(Continued)

FOREIGN PATENT DOCUMENTS

| | | |
|---|---|---|
| CN | 104348887 | 2/2015 |
| EP | 2825959 | 1/2015 |

(Continued)

*Primary Examiner* — Padma Mundur
(74) *Attorney, Agent, or Firm* — Potomac Law Group, PLLC; George Dolina (57) ABSTRACT

A management process monitors a cloud, such as a hybrid cloud, for utilization policy compliance rather than burdening requesting users. A hybrid cloud system requests an action directly of a cloud interface process that processes the request using a management process or externally, such as directly through a cloud service. Users complying with utilization policies are able directly to implement actions or resource allocations without the burden of policy enforcement processes intervening at a time an action is requested.

20 Claims, 5 Drawing Sheets

(56) References Cited

U.S. PATENT DOCUMENTS

| | | | |
|---|---|---|---|
| 2010/0131649 A1* | 5/2010 | Ferris | G06F 9/5072 709/226 |
| 2012/0011077 A1* | 1/2012 | Bhagat | G06Q 10/0635 705/317 |
| 2012/0204187 A1 | 8/2012 | Breiter | |
| 2012/0297059 A1* | 11/2012 | Bross | G06F 11/3006 709/224 |
| 2012/0297069 A1 | 11/2012 | Duchastel | |
| 2012/0297444 A1* | 11/2012 | Kacherov | H04L 63/20 726/1 |
| 2013/0086585 A1 | 4/2013 | Huang et al. | |
| 2013/0185413 A1 | 7/2013 | Beaty et al. | |
| 2013/0219156 A1* | 8/2013 | Sears | H04L 41/0866 713/1 |
| 2013/0325433 A1 | 12/2013 | Thomas et al. | |
| 2014/0310332 A1* | 10/2014 | Huang | H04W 4/60 709/203 |
| 2015/0261561 A1 | 1/2015 | Ashok et al. | |
| 2015/0067397 A1 | 3/2015 | Naseh et al. | |
| 2016/0041787 A1 | 2/2016 | Nicolae | |
| 2016/0373289 A1* | 12/2016 | Hernandez | H04L 41/16 |

FOREIGN PATENT DOCUMENTS

| | | |
|---|---|---|
| EP | 2831746 | 2/2015 |
| EP | 2875440 | 5/2015 |
| WO | 2011110571 | 9/2011 |
| WO | 2013138317 | 9/2013 |
| WO | 2014007811 | 1/2014 |
| WO | 2014058411 | 4/2014 |
| WO | 2014158066 | 10/2014 |

\* cited by examiner

NETWORK RESOURCE MANAGEMENT DEVICES METHODS AND SYSTEMS

CROSS REFERENCE TO RELATED APPLICATIONS

This application claims the benefit of U.S. Provisional Application 62/107,634, filed on Jan. 26, 2015 and entitled "Network Resource Management Devices Methods and Systems," the disclosure of which is incorporated herein by reference in its entirety.

BACKGROUND

Cloud computing is a term used to describe systems and methods that provide dynamically scalable computing resources, usually in a networked environment. Such services are often virtualized and delivered as a service over the Internet on a subscription basis. For example, customers of cloud services can rent the capacity provided by one or more servers simply by ordering them up (or "instantiating") one or more servers. Users need not have sufficient expertise even to know the specific hardware or software resources required, or that they are using when they order capacity. Cloud users generally do not own the physical resources but in some cases they do because of cost considerations. For example, some users can own servers, which are cost-effectively fully utilized, and subscribe to cloud services to fill the gap in their deployment. The majority of cloud computing infrastructures typically include services delivered through data centers and built on servers with different levels of virtualization technologies.

Cloud services are commonly accessed from a web browser through sessions that are generated by software running on server or a cloud. Cloud services, sometimes called "hybrid cloud," can be implemented as a combination of privately-owned resources on a private network or Internet, and public cloud resources that are ordered and utilized as required. Public clouds are provided by third party vendors. Hybrid clouds provide an optimum combination of public and private cloud resources for greatest cost-effect. Private clouds can include on-premise Infrastructure-as-a-Service (IaaS) cloud resources, although other types of legacy infrastructure can be integrated in a hybrid cloud service such as mainframes and legacy server "blades."

In a cloud resource, one or more physical host machines or virtual machines (VMs) or nodes operate using a respective operating system and software applications. A virtual machine monitor or VMM manages the allocation and virtualization of computer resources to cycle between various VMs to provide virtual isolation of the VMs in the cloud system thereby providing privacy for the respective users. Note that users may refer to an institution or organization or group of individuals or single individual within an institution or organization and cloud may refer to a hybrid, public, or private cloud-type resource.

In current cloud systems, management processes of the cloud computing system poll for data concerning the status of managed components such as server instances. The management process is centralized and may be run on any suitable processor sufficiently connected to the hybrid cloud, for example it may run on one or more nodes of the hybrid cloud including one or more virtual machines. The status of a component may be indicated by state information such as memory allocation, space available on rotating or SSD media or other non-volatile storage, duty cycle, system load, bandwidth utilization factor, and network interaction details. The management process may compare a status policy with the status information to determine if a node matches the status policy. In prior art systems, the status information may be principally concerned with the state of specific resources and policies directed at those specific resources.

Another type of policy, herein referred to as utilization policy, codifies the obligations of users according to the cloud resource owner as to the types and amount of resources that may be created, authorization to make changes, and how changes may be made. Utilization policies are enforced when resources are allocated or changed. Utilization policies refer to parameters of the resource allocation that may be established by the user at the time of the request for the resource or when a change is made to a resource. They are factors for which compliance can be established at the time the resource is set up or modified by a user. In current systems, when a user is to make a change that may implicate a policy, a user interface may be provided by a management process to allow a request to be made for the change so that the request can be evaluated against the policy. This prevents non-compliant requests from being implemented. Thus, at the time a request for allocation or modification of an existing allocation is made, the compliance can be determined and there is no chance that an allocation will be non-compliant with a utilization policy. For the status policy, the resources are monitored because they may change over time due to factors that cannot be captured by testing the requests made by a user. The status policies relate to factors that can change during use, i.e. state information. The modifier status is used here in as a label to identify the class of requirements described herein and is not intended to limit according to a dictionary definition of status as construed literally or metaphorically. The same is true for the modifier utilization. The policies and status identify respective data stored in computer accessible data storage such as disk drives, volatile and non-volatile memory, and other types of data storage. The term database, as used herein, identify the physical and software infrastructure required to store and retrieve data.

SUMMARY

A management process monitors a cloud, such as a hybrid cloud, for utilization policy compliance rather than burdening requesting users. In an embodiment, a user of a hybrid cloud system requests an action directly of a cloud interface process that processes the request. This can be done using a management process or externally, such as directly through a cloud service. Independently, and as part of a cloud management process, a scheduler establishes a prioritized to-do list of a data harvester that captures information by polling resources, which may include the resource targeted (again, independently) by the user's resource request. The harvester's actions store the received raw data characterizing the resource. The raw data is translated to a framework used for normalization of the characteristics of the hybrid cloud and stored in a database which is available to a supervising user which may (or may not) be different from the action-requesting user. In response to the data added to the database, the management process may take action to correct a utilization policy compliance failure, notify the requesting or supervising user, or both. In this way, users complying with utilization policies are able directly to implement actions or resource allocations without the burden of policy enforcement processes intervening at a time an action is requested.

Objects and advantages of embodiments of the disclosed subject matter will become apparent from the following description when considered in conjunction with the accompanying drawings.

BRIEF DESCRIPTION OF DRAWINGS

Embodiments will hereinafter be described in detail below with reference to the accompanying drawings, wherein like reference numerals represent like elements. The accompanying drawings have not necessarily been drawn to scale. Where applicable, some features may not be illustrated to assist in the description of underlying features.

DESCRIPTION

The following description imports the full background description of cloud and hybrid cloud systems, which defines the surrounding context of the disclosed inventive subject matter and provides some details thereof. It will be understood from this context, general knowledge of networks and cloud systems, and the discussion below that the claims include making changes to computer network systems that include changes to the physical configuration of network resources including the disconnection of resources from a set of resources available to a particular user, for example. The physical configuration may be implemented through programmatically-controlled "switches" that route commands to certain resources and not others, even though these may be physically connected. Nonetheless, such programmatically-controlled switches define the nature of the physical resource set that comprehends a given hybrid cloud configuration. According to the disclosure and claims, the hybrid cloud configuration may expand by adding resources or contract by removing them. Further, the functional properties of network resources may be modified to change how resources are used all automatically under control of the described and claimed processes, systems, and methods. Network engineers will understand that this switching happens through the control methods and systems through application API (application programming interface) calls to a virtual interface that connects to and controls multiple interconnected resources including physical computers with switching capabilities which control and regulate network traffic thereby regulating the physical resources available in a hybrid cloud system, how they are used, how they respond, and other functions of the resources in a virtual system.

Figure 1:
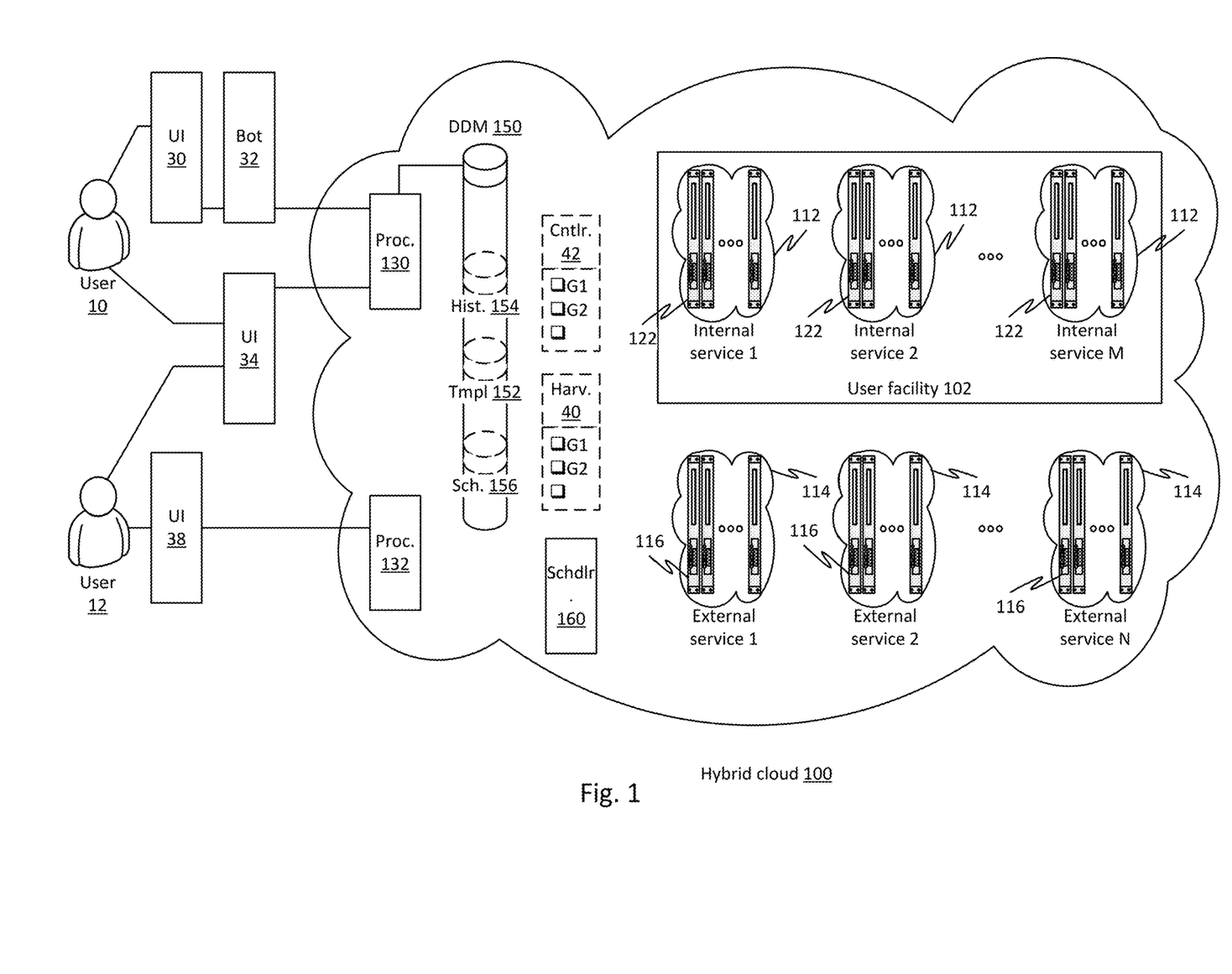
FIG. 1 shows a hybrid cloud system with server nodes and storage and processor components in an exemplary environment according to an embodiment of the disclosed subject matter.

FIG. 1 shows a schematic of a hybrid cloud system 100 with server nodes 122, one or more non-volatile storage components (e.g., drives) 150, 152, 154, 156, and processor components 130 and 132 (which may be physically embodied in the nodes, a single computer or multiple computers) in an exemplary environment according to an embodiment of the disclosed subject matter. Servers 122 may be provided as a number of services of one or more private cloud services 112 in one or more user-operated facilities 102 all or some of which are interconnected by a network and/or internet. Servers 116 may be provided as a number of services of one or more public cloud services 114 in one or more cloud service operated facilities forming a hybrid cloud service 100 that is managed through processes 130 and 132 of private, hybrid or a purchasable service. In an embodiment of the disclosed subject matter, a management process 130 manages a data model 150 that represents characterizing data of hybrid cloud resources which employ a uniform framework that is common to all the resources serviced by the management process 130. This data model 150 may store a current status of the various resources under management translated into the common framework. This data may be queried by a user or automatically presented as part of a report or otherwise made available for purposes of inspection or control according to known principles.

As discussed below, the data model data may be cached by continuously polling the resources, typically through a service such as a cloud service provider, receiving response data from the resources, translating the received data into the uniform framework, and storing it. Historical records of the data model 150 data may be stored as indicated at 154. The history of resources may be used by the management process 130 to implement certain history-determined features of the management system. For example, trends of utilization may be stored and or used to predict upcoming requirements changes or security problems. The historical data may be gathered, stored in a database, and made available through network or internet connections according to known processes. Current and historical data may be processed through a rule base, machine learning system, or other process in order to classify current and future events and associated confidences. Output from such classifiers may be used to generate notifications to users, operators, IT administrators, or to instantiate processes that automatically take action such backing up predefined data, terminating a server, disconnecting a connection between cloud resources and between resources and the outside, sharing resources among components of the cloud, blocking users, changing IP addresses, starting up security processes, and other actions. Other examples of management functions of management process 130 include adding and deleting cloud accounts; starting, stopping, resizing, and rebooting instances and virtual servers; creating, attaching, detaching, and deleting volumes; creating snapshots, viewing, adding, and removing security groups and rules; creating, deleting, and updating DNS support; assigning and removing public IP addresses; deploying, adding, viewing, and remove users; and creating and managing multiple network interfaces. Examples of data collected and provided to users by the management process 130 include costs by varying schedules and resource and/or resource group, change logs and change history; security alerts and notifications of security rule changes; resource utilization including disk, CPU, and memory usage on instances; optimization parameters to avoid unused phantom resources; and security reports for example from installed packages.

A user 10, which may be an organization or group of individuals in an organization accesses through one or more user interfaces 30, 34, 38 cloud resources to instantiate new resources, make changes to existing resources, terminate resources. Examples of resources are servers, which may be physical or virtual machines, bandwidth reservation, guaranteed service levels, security features, etc. A management service processor indicated at 130 generates a user interface 30 for management of a process 32 called a bot which takes actions on behalf of a user 10 so as to lessen the tedium of accessing resources. The user interface 30 may provide menus to modify parameters of a service-provided bot, a programming interface (API) for the user's 10 program scripts, or other features to enable the user 10 to specify requirements automatically in response to conditions or simply to reduce the tedium of data entry. For example, the bot may incorporate profiles of a server to be instantiated. The bot may also take action, such as instantiating a new server or terminating a server in response to detected conditions such as indications in a database of resources being over-taxed or under-utilized.

The user interface 34 allows direct requests by the user 10 without a bot intermediary. The user 10 or any other user 12 may also make service requests and changes through a further process 132 that manages cloud systems in accordance with prior art embodiments. For example, a cloud service provider may provide a process 132 that generates web pages and/or API for making service requests as discussed in the background section. The above-identified processes may be implemented through any suitable combination of hardware and software.

Figure 2:
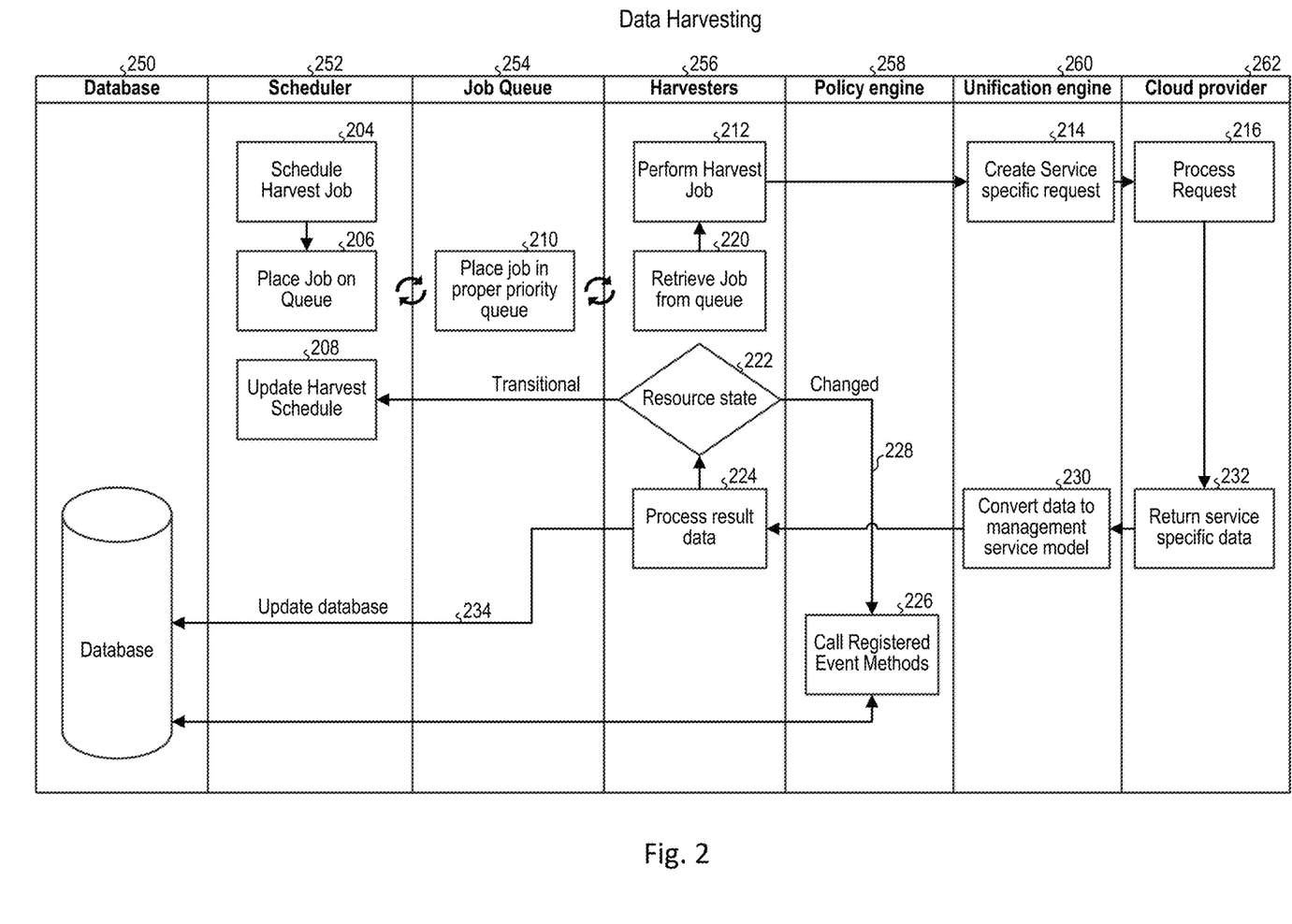
FIG. 2 shows a swim lane diagram of the processing and storage components of a cloud management system implementing a data harvesting operation that is continuously implemented according to embodiments of the disclosed subject matter.

FIG. 2 shows a swim lane diagram of the processing and storage components of a cloud management system implementing a data harvesting operation that is continuously implemented according to embodiments of the disclosed subject matter. A database 250, scheduler 252, database 250, job queue 254, harvester 256, policy engine 258, and unification engine 260, identify processes and/or data structures, respectively that are parts of a cloud management system and provide the functions described below and may be provided by a one or more computer processors and associated storage and memory, which may or may not be a separate system or part of or similar to the cloud resources managed by the cloud management system. The scheduler 252 continuously schedules a harvest job 204 and places the job 206 on a job queue 254. The jobs are retrieved from the queue 254 after being prioritized 210 by harvesters 256 which perform 212 respective harvest tasks indicated by the retrieved jobs. Harvest tasks are effective to request and obtain status data including infrastructure data and metadata from network system resources. To make a request, one or more requests and associated data associated with the harvest job may be translated from a language used by the management system to language system used by the host of the resource (cloud provider 262) as indicated at 214. For example, the resource may be a server hosted by the cloud provider 262. The cloud provider 262 processes the request 216 and returns requested data 232 in a language of the provider 262 to the unification engine 260 which translates it 230 to the language of the management system. The harvester 256 processes translated data and stores the result on a database 250.

The harvester determines whether a change has occurred or is currently in a transitional state by comparing the current translated data to prior data from the database 250, both relating to the instant resource. If the state is transitional the scheduler 252 is informed of this by applying associated data thereto. The scheduler, in response, updates the harvest schedule for the resource responsively to it being in a transitional state. In embodiments, the frequency of updates regarding the resource may be increased so that the database representation of all resources represents a more current status. If the process 224 indicates that a change has occurred and completed, for example it discovers a new server instance, one or more policy methods may be called by a policy engine 258 as indicated at 226 in order to evaluate data relating to the changed (e.g., updated, terminated, or new) resource. The methods 226 may take some action in response to the data such as terminate an instance of a policy-violating server, notify an administrator or some other action. In particular, the registered methods 226 hosted by the management system may receive and act on metadata associated with the network resource. Registered methods 226 may include procedures defined by a user of the cloud system. These may be provided as scripts that detect changes in the configuration of the network system.

Figure 3:
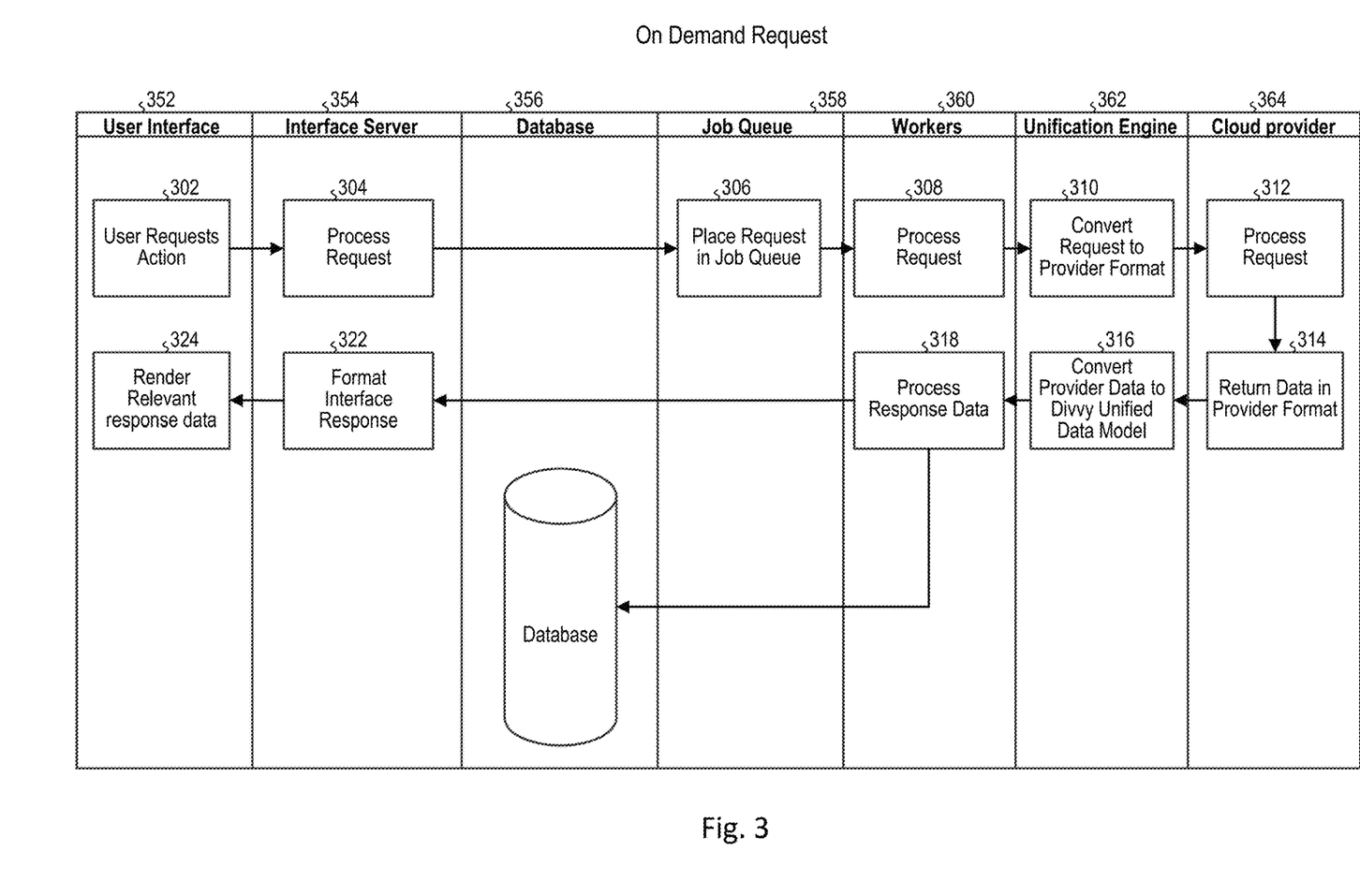
FIG. 3 shows a swim lane diagram of the processing and storage components of a cloud management system implementing an on-demand request for a cloud resource according to embodiments of the disclosed subject matter.

FIG. 3 shows a swim lane diagram of the processing and storage components of a cloud management system implementing an on-demand request for a cloud resource according to embodiments of the disclosed subject matter. A user interface 352 is generated by the management system and receives a request for action 302. An interface server 354 processes the request 304 which may include formatting, adding data such as priority and scheduling data, metadata, billing data, etc. and places a specification for fulfilling the request on a job queue 358 as indicated at 306. The request is retrieved from the job queue 358, processed by a worker process 360 as indicated by 308, and translated into a native format and language executable by the cloud provider 364 by a unification engine 362 as indicated at 310. The processing 308 may include functions such as formatting, adding data such as priority and scheduling data. A response may be generated as indicated at 314 by the cloud provider 364. This response may be translated 316 into the common framework for the management system by the unification engine 362. The worker 360 may process the response data 318 and store a corresponding update indicating the modified system configuration in the database 320, which may be the same as database 356. This latter process may be omitted such that the configuration discovery process may update the configuration of the system instead, but an advantage is that by the worker updating the database 256 immediately upon completion of a change, the database 356 may remain more up-to-date. The interface server 354 may present the response data formatted at 322 and provided by the user interface 352 as indicated 324.

Figure 4:
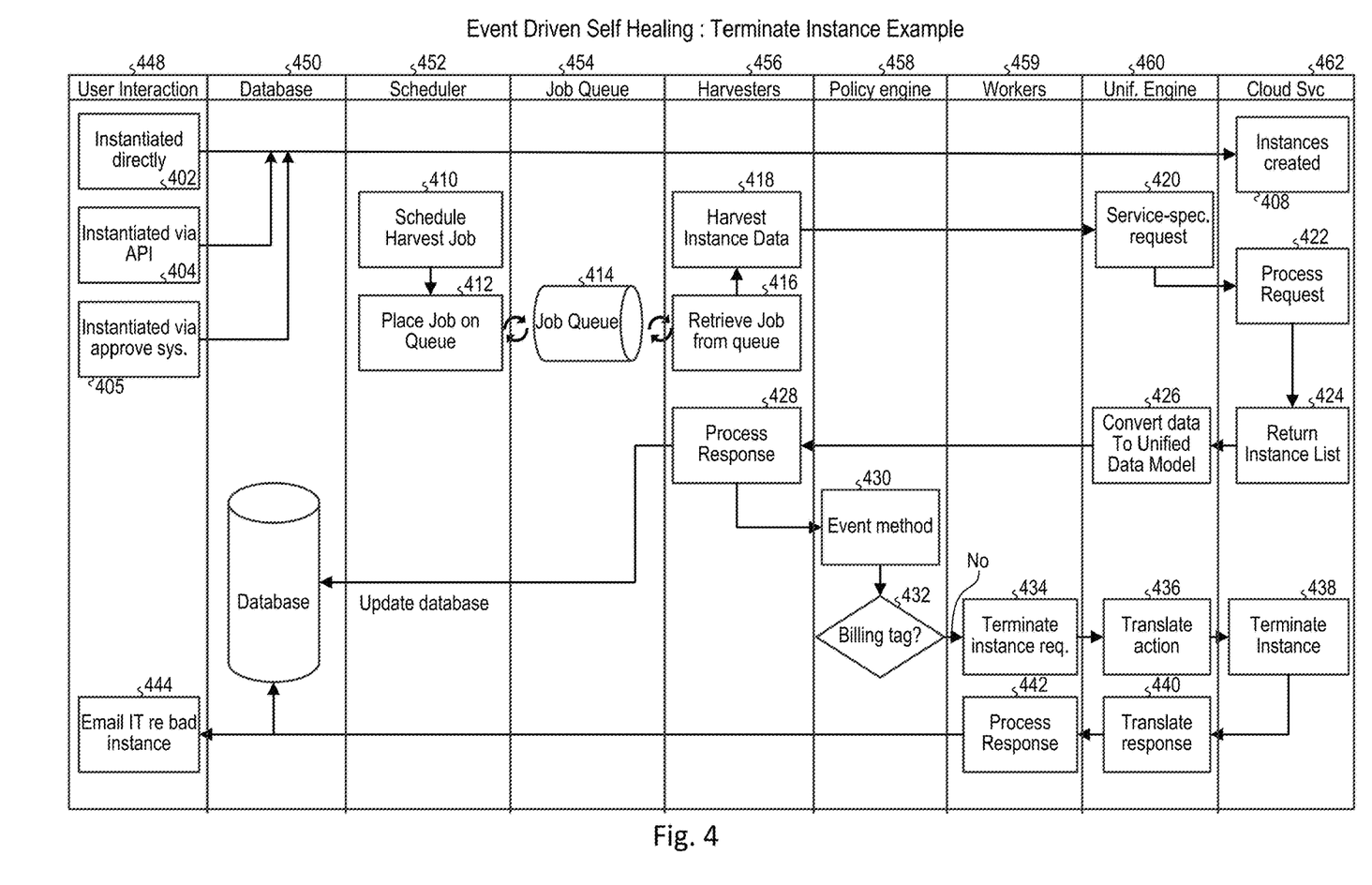
FIG. 4 shows a swim lane diagram of the processing and storage components of a cloud management system implementing a check and termination an instantiated resource based on failure to comply with a utilization policy according to embodiments of the disclosed subject matter.

FIG. 4 shows a swim lane diagram of the processing and storage components of a cloud management system implementing a check and termination an instantiated resource based on failure to comply with a utilization policy according to embodiments of the disclosed subject matter. Four different processes for creating an instance of a network resource of a public or private cloud or combination (hybrid) cloud system are illustrated. At 402, a user, through a user interface of a specific cloud service 462 such as the private or public cloud interface, creates an instance of a resource 408 such as a server. This may be done through an interface of a public cloud system such as Amazon Web Services (AWS) and independently of the network management system. As a result, in this example, an instance 408 of a network resource such as a server or virtual server or other type of unit creatable and discoverable through the cloud service 462 native interface, may be created without the network management system discovering any errors or other parameters of the new instance 408.

In another example, a new instance 408 is created through an interface by a process that may be identified as a bot, which can be any kind of process that performs actions on behalf of a user and may be facilitated through a machine-machine interface here identified as an application program interface (API) 404. The user may program or modify properties of the bot and the bot may create one or more instances upon command or upon detection of an event. The result is a new instance 408 of a network resource on the target service. Recall that the management service that includes all the database 450, scheduler 452, database 450, job queue 454, harvester 456, policy engine 458, and unification engine 460, as well as workers 459, which are processes and/or data structures, respectively of the cloud management system and provide the functions described below. As above in FIG. 2, these may be provided by a one or more computer processors and associated storage and memory, which may or may not be a separate system or part of or similar to the cloud resources managed by the cloud management system. The cloud management system may be independent of the cloud service 462 and permit a user of the cloud management system to create instance of the network resource without a policy enforcement process intervening. Here, as described below, the cloud management system instead detects a bad instance and takes corrective action after the user has created it.

The scheduler 452 continuously schedules a harvest job 410 and places the job 414 in a job queue 454. The jobs 414 are retrieved 416 from the queue 454 after, optional prioritization 410 by harvesters 456, which perform 418 respective harvest tasks indicated by the retrieved jobs. Harvest tasks are effective to request and obtain status data including infrastructure data and metadata from network system resources. To make a request, one or more requests and associated data associated with the harvest job may be translated from a language used by the management system to language system used by the unification engine 460 and delivered to the cloud service 462 as indicated at 422. The cloud provider 462 may process the request 422 and return an instance list 424 which is converted 426 from the language of the provider 462 by the unification engine 460 to the language of the management system. The harvester 456 processes translated data (instance list) and stores the result on a database 450. The processing of the response 428 may include applying data responsive to the translated instance list to an event detection method 430. In the example, a correct fulfillment of a billing tag is detected 438 in metadata associated with the new instance 408. If the billing tag 432 fails the event method's 430 test, then the instance may be terminated by creating a request (by a worker 459 that takes control tasks off a queue in a manner similar to the harvester) in the language of the management process 434, the request is translated 436 to a request format and language adapted for processing by the cloud service 462 whereupon the service 462 terminates the instance. In the example, the bad billing tag is in metadata and is detected by the event method. A response received from the service 462 is translated 440 and the response 442 processed by the worker. The database 450 may be updated so that it shows a current history and current configuration of the total cloud system (including the user-owned resources of the cloud service 462) managed by the cloud management system. Additional responses may be generated such as a notification email to an administrator indicating the bad instance and its termination as well as details of the failing metadata. Note, if not clear from the above, the cloud service 462 may be a resource all or a part of which is managed by the user cloud management system of which the processes 450 through 462 are parts.

If the process 224 indicates that a change has occurred and completed, for example it discovers a new server instance, one or more policy methods may be called by a policy engine 258 as indicated at 226 in order to evaluate data relating to the changed (e.g., updated, terminated, or new) resource. The methods 226 may take some action in response to the data such as terminate an instance of a policy-violating server, notify an administrator or some other action. In particular, the registered methods 226 hosted by the management system may receive and act on metadata associated with the network resource. Registered methods 226 may include procedures defined by a user of the cloud system. These may be provided as scripts that detect changes in the configuration of the network system.

Figure 5:
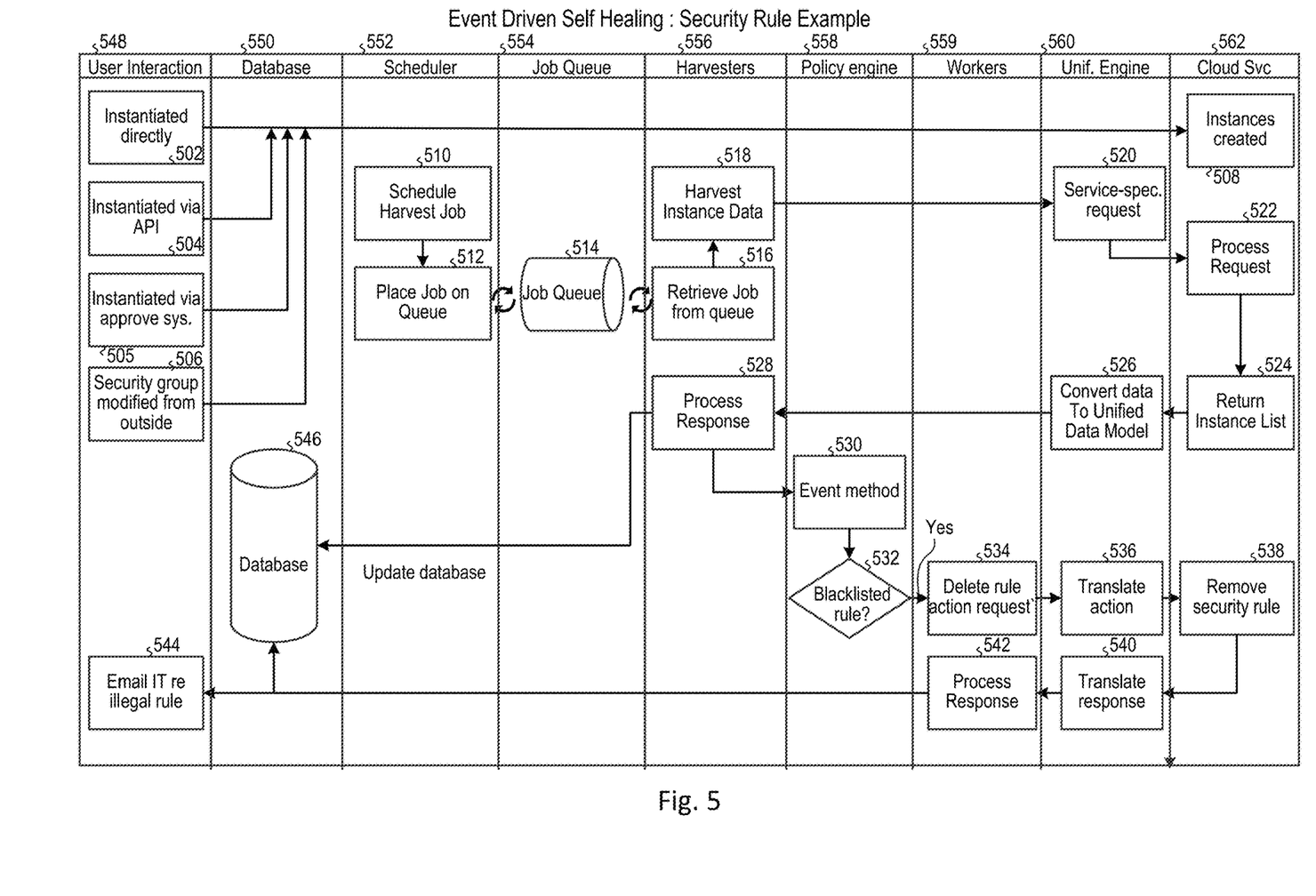
FIG. 5 shows a swim lane diagram of the processing and storage components of a cloud management system implementing a correction of an instantiated resource based on failure to comply with a utilization policy according to embodiments of the disclosed subject matter.

FIG. 5 shows a swim lane diagram of the processing and storage components of a cloud management system implementing a correction of an instantiated resource based on failure to comply with a utilization policy according to embodiments of the disclosed subject matter. Four different processes for creating an instance of a network resource of a public or private cloud or combination (hybrid) cloud system are illustrated. At 502, a user, through a user interface of a specific cloud service 562 such as the private or public cloud interface, creates an instance of a resource 508 such as a server. This may be done through an interface of a public cloud system such as Amazon Web Services (AWS) and independently of the network management system. As a result, in this example, an instance 508 of a network resource such as a server or virtual server or other type of unit creatable and discoverable through the cloud service 562 native interface, may be created without the network management system discovering any errors or other parameters of the new instance 508. Other mechanisms for instantiating a new resource may be utilized by a user including a separate system, for example a process, such as a bot, owned by the user and separate from the cloud management system, but acting as a proxy for the user. Such a bot could interact with a user interface generated by the separate system or through a control interface (e.g., API) provided by the management system.

In another example, a new instance 508 is created through any of the mechanisms identified above in FIG. 4 (402, 404, 405). The result is a new instance 508 of a network resource on the target service, in this example, the instance has been created with a policy-violating security rule. Another example in which an instance may be created is the modification of a security group 506 which may be done by an external system or locally within the management system.

Recall that the management service that includes all the database 550, scheduler 552, database 550, job queue 554, harvester 556, policy engine 558, and unification engine 560, as well as workers 559, which are processes and/or data structures, respectively of the cloud management system and provide the functions described below. As above in FIG. 2, these may be provided by a one or more computer processors and associated storage and memory, which may or may not be a separate system or part of or similar to the cloud resources managed by the cloud management system. The cloud management system may be independent of the cloud service 562 and permit a user of the cloud management system to create instance of the network resource without a policy enforcement process intervening. Here, as described below, the cloud management system instead detects a policy violation and takes corrective action after the user has made the change or created the instance it.

The Scheduler 552 continuously schedules a harvest job 510 and places the job 514 in a job queue 554. The jobs 514 are retrieved 516 from the queue 554 after, optional prioritization 510 by harvesters 556, which perform 518 respective harvest tasks indicated by the retrieved jobs. Harvest tasks are effective to request and obtain status data including infrastructure data and metadata from network system resources. To make a request, one or more requests and associated data associated with the harvest job may be translated from a language used by the management system to language system used by the unification engine 560 and delivered to the cloud service 562 as indicated at 522. The cloud provider 562 may process the request 522 and return an instance list 524 which is converted 526 from the language of the provider 562 by the unification engine 560 to the language of the management system. The harvester 556 processes translated data (security group list) and stores the result on a database 550. The processing of the response 528 may include applying data responsive to the translated instance list to an event detection method 530. In the example, a security rule is tested by the event method 530. If the security rule fails, for example it is found on a blacklist 532, the security rule may be terminated by creating a request as in FIG. 4 embodiment, or alternatively in the present example, a request is generated to delete the violating rule (by a worker 559 that takes control tasks off a queue in a manner similar to the harvester) in the language of the management process 534, the request is translated 536 to a request format and language adapted for processing by the cloud service 562 whereupon the service 562 removes the security rule. In the example, the bad billing tag is in metadata and is detected by the event method. A response received from the service 562 is translated 540 and the response 542 processed by the worker. The database 550 may be updated so that it shows a current history and current configuration of the total cloud system (including the user-owned resources of the cloud service 562) managed by the cloud management system. Additional responses may be generated such as a notification email to an administrator indicating the bad security rule and its deletion as well as any further details. Note, if not clear from the above, the cloud service 562 may be a resource all or a part of which is managed by the user cloud management system of which the processes 550 through 562 are parts.

In any of the above embodiments, policies and/or event methods implementing them may be configured as customizable modular processes or data structures offered by the network management process or as separate scripts hosted by the management process and provided by each user. In the preferred and illustrative embodiments, the management process policy engine implements the event method and as indicated can employ various schemes for providing the custom functionality desired by a user, including a selectable list of options. Other alternatives will be derivable from a general background in software in combination with the instant teachings of the present application. The system supporting the event method may be the cloud system, a portion (public or private cloud), a separate system, or any other.

It will be appreciated that the modules, processes, systems, and sections described above can be implemented in hardware, hardware programmed by software, software instruction stored on a non-transitory computer readable medium or a combination of the above. For example, a method for managing network resources can be implemented, for example, using a processor configured to execute a sequence of programmed instructions stored on a non-transitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C++, C#.net or the like. The instructions can also comprise code and data objects provided in accordance with, for example, the Visual Basic™ language, LabVIEW, or another structured or object-oriented programming language. The sequence of programmed instructions and data associated therewith can be stored in a non-transitory computer-readable medium such as a computer memory or storage device which may be any suitable memory apparatus, such as, but not limited to read-only memory (ROM), programmable read-only memory (PROM), electrically erasable programmable read-only memory (EEPROM), random-access memory (RAM), flash memory, disk drive and the like.

Furthermore, the modules, processes, systems, and sections can be implemented as a single processor or as a distributed processor. Further, it should be appreciated that the steps mentioned above may be performed on a single or distributed processor (single and/or multi-core). Also, the processes, modules, and sub-modules described in the various figures of and for embodiments above may be distributed across multiple computers or systems or may be co-located in a single processor or system. Exemplary structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a programmable logic device (PLD), programmable logic array (PLA), field-programmable gate array (FPGA), programmable array logic (PAL) device, or the like. In general, any process capable of implementing the functions or steps described herein can be used to implement embodiments of the method, system, or a computer program product (software program stored on a non-transitory computer readable medium).

Furthermore, embodiments of the disclosed method, system, and computer program product may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a very-large-scale integration (VLSI) design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of computer engineering and/or computer programming arts.

Moreover, embodiments of the disclosed method, system, and computer program product can be implemented in software executed on a programmed general purpose computer, a special purpose computer, a microprocessor, or the like.

It is, thus, apparent that there is provided, in accordance with the present disclosure, network resource management devices, methods, and systems. Many alternatives, modifications, and variations are enabled by the present disclosure. Features of the disclosed embodiments can be combined, rearranged, omitted, etc., within the scope of the invention to produce additional embodiments. Furthermore, certain features may sometimes be used to advantage without a corresponding use of other features. Accordingly, Applicants intend to embrace all such alternatives, modifications, equivalents, and variations that are within the spirit and scope of the present invention.

The invention claimed is:

1. A method of controlling a configuration of a cloud computing environment that includes a network system and at least one processor to modify the configuration of the cloud computing environment deviating from a utilization policy that specifies at least one security rule for the cloud computing environment, the method comprising:
   receiving a request directly from a user of the cloud computing environment for allocation of an instance of a resource or a modification of an allocated instance of a resource;
   fulfilling the request without intervention for enforcement of the utilization policy in response to the request;
   scheduling a harvest task that obtains on a repeating schedule data that specifies configurations of instances of resources of the network system that is a part of the cloud computing environment;
   receiving first infrastructure status data that specifies configurations of the instances of the resources of the network system in response to an output of the harvest task;
   translating said first infrastructure status data from a first format to a second format that is different from the first format;
   storing the translated first infrastructure status data in the second format in a status database;
   comparing the translated first infrastructure status data stored in said status database with status data in the second format, previously stored in the database;
   detecting a change in the configuration of the network system based on a result of the comparing, the change caused by at least one of the modification of the allocated instance of the network resource and a new instance of a network resource of said network system;
   comparing properties of the at least one of the modified instance of the network resource and said new instance of the network resource against the at least one security rule to detect a deviation from the at least one security rule; and
   generating instructions to further modify the at least one of the modified instance of the network resource and the new instance of the network resource so that it satisfies the at least one security rule, or to terminate the at least one of the modified instance of the network resource and the new instance of the network resource responsively to a result of said comparing of the properties.

2. The method of claim 1, wherein
   the cloud computing environment includes a hybrid cloud, and
   said utilization policy specifies network infrastructure or a bandwidth utilization factor.

3. The method of claim 1, wherein said utilization policy specifies metadata.

4. The method of claim 1, wherein said utilization policy specifies infrastructure features of the network system that are permanent features defined at a time of a request for a change by a user of a management system implementing said method and thereby do not change during use.

5. The method of claim 1, wherein the harvest task requests an instance list.

6. The method of claim 1, wherein said utilization policy includes a security rule blacklist.

7. The method of claim 1, wherein the status data includes metadata.

8. The method of claim 1, wherein the status data includes metadata representing an entity responsible for creating the new instance.

9. The method of claim 1, wherein the status data includes metadata representing billing information relating to the use of said new instance.

10. The method of claim 1, further comprising:
    determining whether the data that specifies the configurations of the instances of the resources of the network system is in a transitional state, and
    modifying the repeating schedule to increase a frequency of the harvest task in response to a determination that said data is in the transitional state.

11. A non-transitory computer readable medium having stored thereon instructions for a method of controlling a configuration of a cloud computing environment that includes a network system and at least one processor to modify the configuration of the cloud computing environment deviating from a utilization policy that specifies at least one security rule for the cloud computing environment, the method comprising:
    receiving a request directly from a user of the cloud computing environment for allocation of an instance of a resource or a modification of an allocated instance of a resource;
    fulfilling the request without intervention for enforcement of the utilization policy in response to the request;
    scheduling a harvest task that obtains on a repeating schedule for data that specifies configurations of instances of resources of the network system that is a part of the cloud computing environment;
    receiving first infrastructure status data that specifies configurations of the instances of the resources of the network system in response to an output of the harvest task;

translating said first infrastructure status data from a first format to a second format that is different from the first format;

storing the translated first infrastructure status data in the second format in a status database;

comparing the translated first infrastructure status data stored in said status database with status data in the second format, previously stored in the database;

detecting a change in the configuration of the network system based on a result of the comparing, the change caused by at least one of the modification of the allocated instance of the network resource and a new instance of a network resource of said network system;

comparing properties of the at least one of the modified instance of the network resource and said new instance of the network resource against the at least one security rule to detect a deviation from the at least one security rule; and generating instructions to further modify the at least one of the modified instance of the network resource and the new instance of the network resource so that it satisfies the at least one security rule, or to terminate the at least one of the modified instance of the network resource and the new instance of the network resource responsively to a result of said comparing of the properties.

12. The medium of claim 11, wherein the cloud computing environment includes a hybrid cloud, and said utilization policy specifies network infrastructure or a bandwidth utilization factor.

13. The medium of claim 11, wherein said utilization policy specifies metadata.

14. The medium of claim 11, wherein said utilization policy further includes policies that relate to infrastructure features of the network system that are permanent features defined at a time of a request for a change by a user of a management system implementing said method and thereby do not change during use.

15. The medium of claim 11, wherein the harvest task requests an instance list.

16. The medium of claim 11, wherein said utilization policy includes a security rule blacklist.

17. The medium of claim 11, wherein the status data includes metadata.

18. The medium of claim 11, wherein the status data includes metadata representing an entity responsible for creating the new instance.

19. The medium of claim 11, wherein the status data includes metadata representing billing information relating to use of said new instance.

20. The medium of claim 11, wherein the method further comprises:

determining whether the data that specifies the configurations of the instances of the resources of the network system is in a transitional state, and modifying the repeating schedule to increase a frequency of the harvest task in response to a determination that said data is in the transitional state.

* * * * *